Sept. 8, 1964
W. M. STAPLER
3,147,620
FLOW METER
Filed Jan. 22, 1962
2 Sheets-Sheet 1
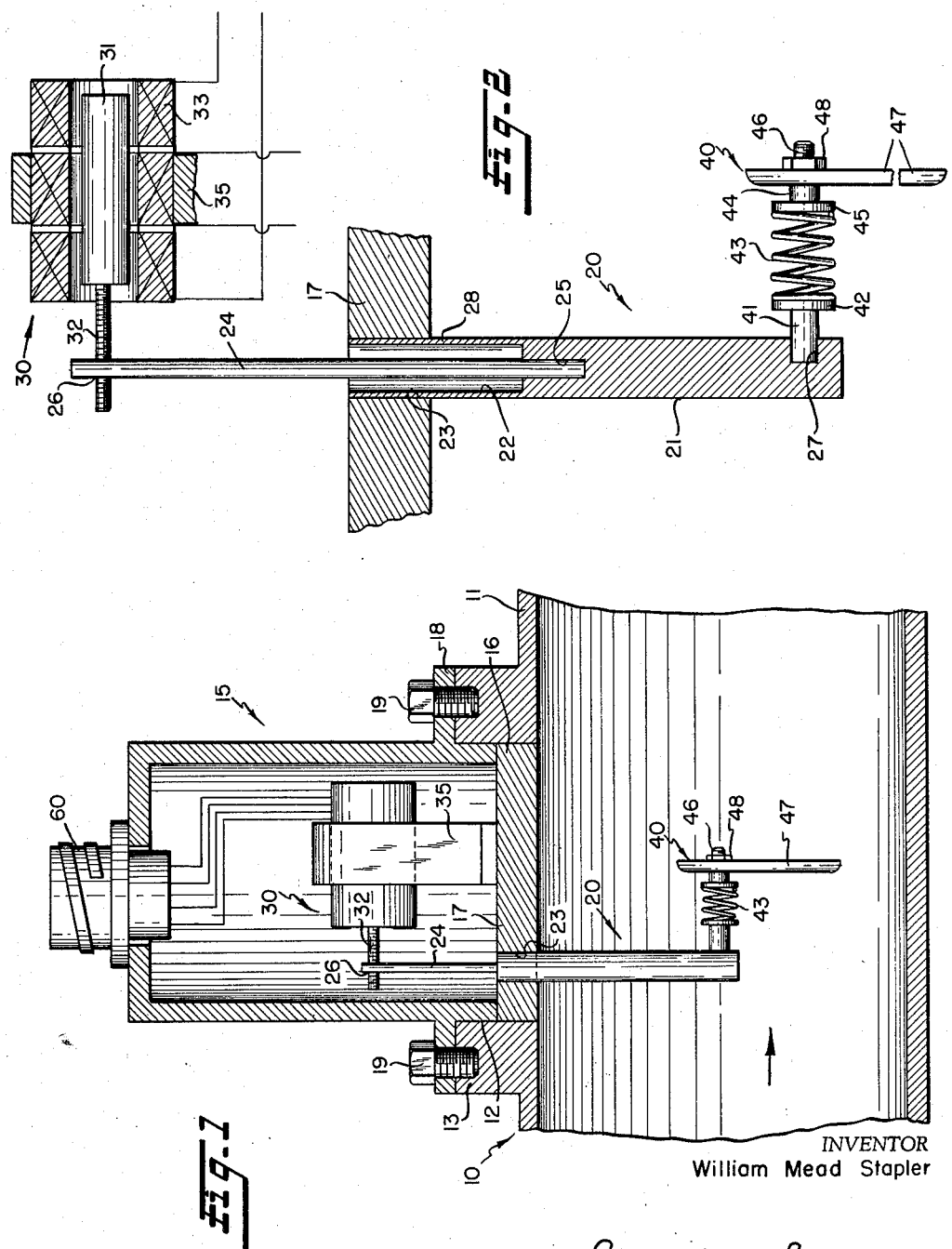
INVENTOR
William Mead Stapler
BY Shlesinger, Shlesinger
& Arkwright
ATTORNEYS INVENTOR
William Mead Stapler

United States Patent Office 3,147,620
Patented Sept. 8, 1964

3,147,620
FLOW METER
William Mead Stapler, 1 Dey Lane, Riverdale, N.J.
Filed Jan. 22, 1962, Ser. No. 167,642
12 Claims. (Cl. 73—228)

This invention relates to a fluid flow measuring device and has to do more particularly with devices employing a drag body supported in the fluid stream by a yieldable support assembly.

The particular advantage of this type of meter lies in its ability to provide accurate measurements with a simple mechanical construction.

These devices might be described as drag body flow meters. Heretofore, various forms and arrangements of the drag body support assembly have been proposed with the object providing a simple, durable structure which will permit accurate flow measurements.

One of the more effective drag body support arrangements for such meters makes use of a cantilever type assembly, and has no intricate or relatively moving parts. Consequently, this meter structure provides a device which is economical to make and is free of wear and maintenance problems encountered in meters with moving parts.

In these drag body support arrangements, the drag body is supported in the fluid stream on the free end of a rigid movable rod. The rod is rigid and extends up into a cavity in the housing which is formed by a thin-walled flexure element with a closed upper end; the flexure element is attached to the housing near its lower open end and to the rod at its closed end. It is thin-walled so that it will readily bend in response to forces transmitted to it from the rod. The magnitude of these forces will vary according to the force exerted on the drag body, which, in turn, is dependent upon the flow rate of the fluid stream. This invention is directed to an improvement in such devices. A typical example of this meter assembly is shown in the Brous Patent 2,742,784.

The rapid accumulation of deposits from the flow stream on the surfaces of the cavity area of these devices has been a drawback in many instances, requiring that the unit be frequently cleaned and serviced. For example, fluids such as milk or milk products build up an accumulation of decayable matter in the cavity area and present a sanitary problem; slurries and fluids which have suspended particles rapidly build up deposits within the cavity area and impede accuracy of the instrument.

Also, due to the construction of the disc assembly and the direct force measurement by a drag body fixed to the rod, there is also considerable resistance to fluid flow particularly at high rate. This has a tendency to limit the capacity of the flowmeter.

Accordingly, a principal object of the present invention is to overcome the above deficiencies in present flow meters.

A further object of the invention is to provide a more compact and sturdy meter assembly than previous devices.

An additional object of this invention is to solve the problem of sediment accumulation in a drag body flow meter.

A further object is to provide a simplified drag body support structure in which there is no cavity to accumulate sediment deposits.

A still further object of the instant invention is to provide a simplified unitary support structure for a cantilever drag body support assembly which does not have a cavity exposed to the moving fluid.

Another object of the invention is to provide a sturdy drag body support element which is easily removed for cleaning and service.

A still further object is to provide a meter assembly which has a greater range than previous devices.

An additional object is to provide a drag body meter which has less resistance to fluid flow, especially at high flow rates.

Yet another object of the present invention is the provision of means for providing a direct linear reading of flow rate based upon the forces exerted upon the drag body element.

A still further object of the invention is the provision of a drag disc body which will be deflected according to the magnitude of the flow forces exerted against it.

Yet another object of the invention is the provision of a drag body whose force resisting frontal surface to fluid flow varies with flow rate.

Other objects and advantages reside in the details of construction, arrangement, and combination of the various parts of my invention as is hereinafter more fully set forth, specifically pointed out in my claims, and illustrated in the accompanying drawings, in which:

FIGURE 1 is an enlarged fragmentary view partially in section showing my flow meter in position on a conduit.

FIGURE 2 is an enlarged fragmentary view of the construction of FIGURE 1, part of which is in section.

Figure 3:
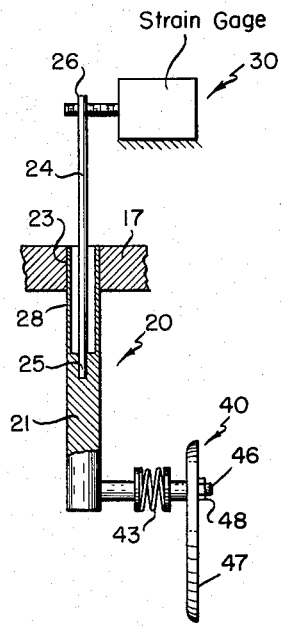
FIGURE 3 is a modification showing a view similar to FIGURE 2 illustrating the position of the drag disc in the undeflected position and showing schematically a strain gage connected to the drag body support assembly.

Referring to the drawings in detail, FIGURE 1 shows a flow meter assembly of applicant's construction mounted on a conduit 10 having a wall 11 and an opening 12. The instrument housing 15 is positioned within the opening 12 and has a suitably shaped portion 16 conforming to the configuration of opening 12, and a lower plate portion 17 flush with the wall 11 of conduit 10. A raised section 13 on conduit 10 adjacent to the opening 12 is provided to support flange 18 of the instrument housing and to receive bolts 19 so that the housing may be readily installed on the conduit. This arrangement permits the flow meter unit to be easily removed for cleaning of the exposed surfaces. A suitable gasket member for sealing purposes is usually provided, but is not shown in the drawing.

In FIGURES 1 and 2, a support assembly 20 is shown extending from the housing 15 and into the flow path, the direction of fluid flow being indicated by the arrow in FIGURE 1. The flexure support assembly generally indicated at 20 is rigidly attached at its upper end to the base 17 of the instrument housing 15 and extends downwardly therefrom into the fluid stream to support the drag body assembly 40.

As shown in FIGURES 1 and 2 the flexure member 21 is a unitary piece which is rigidly supported within opening 23 of plate 17. The connection between the opening and the member is fluid tight to seal the moving fluid stream from the interior of the instrument housing 15. The members 21 and 17 may be joined in a number of conventional ways to give a rigid support and a fluid tight seal. The members may be bonded to each other or threadedly connected.

Upper end portion of member 21 has a hollow bore 22 which is of sufficient length and diameter to provide a thin-walled flexure section as indicated at 28. The length and diameter of this bore will be determined by the relative dimensions of the flexure element. For example, for a flexure unit made of stainless steel and having an outside diameter of .230 inch and an unsupported length of 1.50 inches from the lower surface of the support plate 17 to the line of action through stud 41, it was found advisable to extend the bore to a point .40 inch below the lower surface of member 17, and to provide a bore of .190 inch.

The member 21 may be a single piece which is machined to the desired dimensions, or it might be made of two pieces one of which is a solid rod member and the other a tubular member both of which are joined together.

Figure 4:
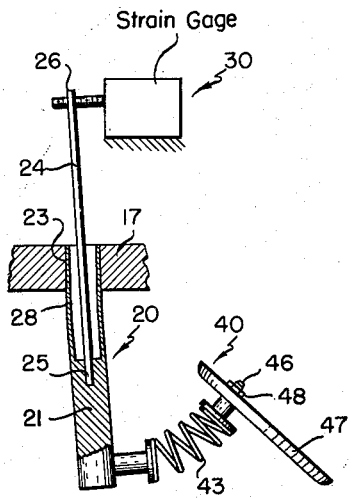
FIGURE 4 shows the structure of FIGURE 3 under flow conditions in which the disc element is shown deflected; the support element is shown in an exaggerated flexed position to illustrate the working of the assembly.

A motion transmitting rod 24 is fixed in recess 25 so that the amount of bending of the flexure member 21 under the influence of forces exerted by the fluid against the drag body assembly, will transmit such movement to a motion transducer assembly 30. In FIGURES 1 and 2 the rod 24 is connected at 26 to a threaded member 32 which supports armature 31 within the coil section 32 of a differential transformer. The transformer is shown in FIGURE 1 supported by a bracket member 35 and wired to a conductor 60. However, any number of devices may be used in place of this arrangement. These devices may be electrical, mechanical, or pneumatic in operation and are well known to those skilled in the art. FIGURES 3 and 4 show a strain gage used as the motion transducer; alternately, strain gages may be applied to the inner surface of thin-wall section 28, or rod 24 may be restrained at its upper end and strain gages applied to the stressed central area of said rod for purposes of sensing.

The support member 21 has attached to its lower end the drag body assembly 40. The assembly shown in the drawing has a resiliently mounted drag disc 477 which is eccentrically mounted so as to pivot about an axis transverse to fluid flow under the forces exerted by the moving stream. A stud 41 is fixed in recess 27 of the flexure member 21 and supports a coil spring 43 which is welded or otherwise secured to the head 42 of stud 41; spring 43, in turn, supports stud 44 at its other end and is welded to head 45. A threaded section 46 on the stud 44 extends through a hole in a flat circular disc 47, and a nut 48 is screwed tight behind the disc 47 to hold it in position. Any suitable support for the disc may be substituted for the above described coil spring support arrangement. For example, a flat spring connected to the flexure support 21 and to the disc 47 might also be used. It is also possible to hingedly connect it to the disc support 21 and provide suitable resilient means to bias the disc 47. Preferably, the disc is eccentrically mounted at a point on its vertical center line about one-quarter of its diameter down from the top of the disc. The spring rate of the assembly is dependent upon the range of flow rate values and the mounting point of the disc. The assembly should be designed to give a disc position as shown in FIGURE 3 for the lower limit flow values and a maximum deflection of seventy to eighty degrees for the upper limit flow rate. Figure 4 shows the assembly position when measuring an intermediate flow rate. The bending of the support element 21 and the displacement of motion transmitting rod 24 is exaggerated for illustrative purposes. The arc of motion of element 21 is usually less than one degree.

In meters of this type the force on the drag body is given by the equation:

$$F = Aw \frac{KV^2}{2g}$$

where

F—Force in pounds
A—Frontal area of the drag body
w—Specific weight of the fluid
K—A constant
V—Velocity of the fluid
g—Force in gravity The constant K is dependent upon the shape of the body, and might be termed the drag body coefficient, inasmuch, as the shape of the body determines to a large measure its value. This coefficient is a function of the Reynolds number, form of the disc normal to the direction of motion, and size and roughness of the body. For a flat circular disc under the usual flow conditions it has a value slightly larger than one.

The decrease in frontal area of the disc as mentioned above corrects for the velocity squared term in the force equation. My support assembly can also be used with a rigidly attached disc; the transducer output curve in this instance would be non-linear.

Figure 5:
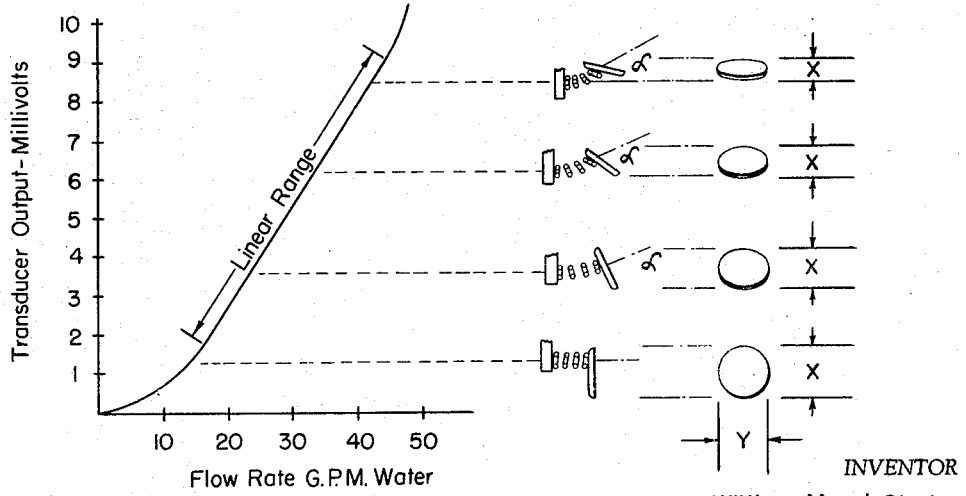
FIGURE 5 shows a graph and the relative positions of the disc and its frontal area at varying flow rates.

FIGURE 5 shows a graph and corresponding positions for the drag discs assembly. The disc frontal area resisting fluid flow diminishes with the increased flow rate to permit a wider range of flow rate measurement. It will be noted that the "X" value diminishes so that the circular area becomes elliptical. This makes possible the linear output as shown in the graph, with the consequent correction for the velocity term in the force equation. However, I do not confine myself to the use of a circular disc in this assembly.

*Operation*

The operation of the device is as follows: Fluid moving against disc 47 exerts a force upon it which is transmitted to the support element 21, causing it to bend at the flexure section 28. Motion transmitting rod 24 is rigidly connected to the lower section of the flexure support element 21, and is displaced a certain distance dependent upon the flexing of the support element. The movement of the transmitting rod 24 affects the transducer assembly 30 which is connected to the rod, and the output of the transducer is proportional to this movement.

The drag disc which is eccentrically mounted pivots about an axis transverse to the fluid flow under the force of the oncoming fluid stream. The pivoting of the disc 47 results in a smaller frontal area opposing fluid flow and thereby reducing the force transmitted to the flexure support element 21. This reduction off-sets the velocity squared term in the force equation mentioned above and makes possible the linear output shown in the graph of FIGURE 5. The flexure support assembly may readily be used without this pivotal drag body assembly, and in that event the output will be non-linear and the range of the instrument will be reduced.

It is possible to use this flow meter device on moving objects such as ships to measure velocity of a moving object with respect to a fluid body, and therefor I do not wish to restrict the application of this device to the measurement of fluid flow in conduits.

While the invention has been described in connection with different embodiments thereof, it will be understood that it is capable of further modifications, and this application is intended to cover any variations, uses or adaptions of the invention following, in general, the principles of the invention including such departures from the present disclosure as come within the well known customary practice in the art to which the invention pertains, and as may be applied to the essential features hereinbefore set forth and as fall within the scope of the invention or the limits of the appending claims.

Having thus described my invention, I claim:

1. A device for measuring fluid flow comprising: a conduit through which fluid is passed and which has an opening in the wall thereof, a base member mounted within said opening and having a surface in contact with a relatively moving fluid, said surface being smooth and being substantially even with the adjacent inner wall of the conduit to provide a smooth, uninterrupted, pocketless boundary and having a hole therein to accommodate a flexural drag body support structure; a flexural support disposed in said stream and rigidly joined to said surface to cover the hole in a fluid tight juncture, said support having an interior hollow section which is connected with said hole; a drag body connected to said element; and sensing means within the hollow section of the flexure element and fixed thereto for obtaining a reading dependent upon flow rate.

2. A fluid flow measuring device comprising: a base member having a surface in contact with a relatively moving fluid and having a hole therethrough; a flexural drag body support member having an end rigidly attached to the base at said opening and extending outwardly therefrom into the fluid; the drag body support having an axial bore at said one end in registry with said hole; a drag body connected to the support; and sensing means connected to said support.

3. A fluid flow measuring device comprising: an instrument housing having a base member with a surface in contact with a moving fluid; and hole through said base member; a long cylindrical drag body support member having an end rigidly attached to said surface to seal said opening and extending outwardly from said surface; the drag body support having an axial bore at said one end which is in registry with said hole to form a cavity; a drag body connected to said drag body support; motion transmitting means within said cavity and rigidly connected to the drag body support; and movement sensing means operably associated with the motion transmitting means.

4. A fluid flow measuring device comprising: an instrument housing mounted on a conduit and having a base section in contact with a fluid moving through the conduit; an elongated flexural drag body support member integral at one end with said base and extending outwardly therefrom into the moving fluid; a hole in the base member in which the drag body support member is rigidly supported in fluid-tight engagement; an axial bore at said one end of the flexural support member; a drag body in the fluid and connected to the drag body support; a motion responsive means in the housing adjacent the hole; and a rod member engaging said means and extending through said opening and into said bore where it is rigidly attached to the drag body support.

5. A fluid flow measuring device comprising: an instrument housing mounted on a conduit and having a base with a surface in contact with a fluid flowing through the conduit; a flexure element integral with the surface at one end and extending outwardly therefrom, said element having a thin-walled flexure section adjacent said one end; sensing means associated with said flexure element; and a drag body in the fluid which is resiliently connected to said element so that a linear output is obtained from the device for a range of flow rate values.

6. A fluid flow measuring device comprising: a base member having a surface in contact with a moving fluid and having a hole therethrough; a flexural drag body support member having an end rigidly attached to the base at said opening and extending outwardly therefrom into the fluid; the drag body support having an axial bore at said one end in registry with said hole; sensing means connected to said support; and a circular disc eccentrically mounted in said fluid stream on a spring member, said spring member being attached to said support.

7. A device for measuring fluid flow comprising: a conduit through which fluid is passed and having an opening in the wall thereof, a base member mounted on said conduit within said opening which has a smooth surface in contact with the relatively moving fluid and disposed substantially even with the inner conduit wall to provide a smooth, uninterrupted, pocketless boundary for the moving fluid, a cantilever support member integral at one end with said surface and extending outwardly therefrom into the moving fluid, a drag body mounted on the support member adjacent its other end, and sensing means connected to the support member for determining the force exerted on the drag body by the fluid stream.

8. A drag body flow meter to be used for a given range of fluid flow rates wherein the drag body is progressively deflected as flow rates increase from minimum to maximum values, comprising, a conduit through which the fluid is passed, a drag disc assembly having a drag disc disposed within the conduit and transverse thereto, said disc having a large face area and a relatively thin cross-section, a support assembly mounted on said conduit and supporting the drag disc assembly, the drag disc being pivotally supported to permit substantial deflection thereof at high flow rates, the drag disc assembly having resilient biasing means which holds the drag disc at a small angle with the axis of a transverse conduit at low flow rates to present a maximum frontal area, and under force of larger flow rates permits progressive deflection to offset the sharply rising force exerted on the disc by increased flow rates so that at large flow rates the disc makes a large angle with the said transverse axis of the conduit thereby decreasing the disc frontal area facing the oncoming fluid, and means associated with said assembly to measure the increased force exerted by the fluid on the drag disc as flow rates increase.

9. The drag body flow meter as set forth in claim 8 wherein the drag disc is supported at a point which is displaced with repsect to the center of frontal area of the disc to facilitate deflection and calibration thereof.

10. The drag body flow meter as set forth in claim 8 wherein the resilient biasing means is a spring which has a spring rate which permits the drag disc to deflect under the pressure of increased flow rates to decrease the frontal area of the disc at such a rate that the force thereon will increase linearly with increased flow.

11. The drag body flow meter as set forth in claim 8 wherein the frontal area of the drag disc at maximum flow rates for the desired range is less than one half that of the frontal area of the disc at minimum flow rates for the desired range.

12. The drag body flow meter as set forth in claim 8 wherein the cantilever support assembly comprises a base member and an elongated support member which is supported on the base member at one end and has a free end which is immersed in the fluid within the conduit, and the drag disc assembly comprises a drag disc and a spring member attached at one end to the free end of the support member and at the other end to the drag disc, the drag disc being a thin circular plate and the spring member being attached thereto at a point approximately midway between the center of the plate and the outside edge thereof.

References Cited in the file of this patent

UNITED STATES PATENTS

| | | |
|---|---|---|
| 1,830,673 | Noren | Nov. 3, 1931 |
| 1,994,970 | Turner | Mar. 19, 1935 |
| 3,050,998 | Dahlke | Aug. 28, 1962 |

FOREIGN PATENTS

| | | |
|---|---|---|
| 948,920 | Germany | Sept. 6, 1956 |